United States Patent [19]

Mauri

[11] Patent Number: 4,502,558
[45] Date of Patent: Mar. 5, 1985

[54] POWER DRIVE SYSTEM FOR ROAD VEHICLES

[76] Inventor: Ambrogio Mauri, Via Garibaldi 254, Desio (Province of Milano), Italy

[21] Appl. No.: 472,553

[22] Filed: Mar. 7, 1983

Related U.S. Application Data

[63] Continuation-in-part of Ser. No. 202,908, Nov. 3, 1980, abandoned.

[51] Int. Cl.$^3$ .................................................. B62D 59/04
[52] U.S. Cl. ................................ 180/14.3; 180/65.2; 180/69.6; 180/305
[58] Field of Search ................. 180/305, 307, 69.6, 180/65.2, 14.3, 14.2; 74/661

[56] References Cited

U.S. PATENT DOCUMENTS

| | | | |
|---|---|---|---|
| 2,060,220 | 11/1936 | Kennedy | 180/305 |
| 2,754,015 | 7/1956 | Lee | 180/242 X |
| 3,367,440 | 2/1968 | Becker | 180/305 |
| 3,394,771 | 7/1968 | Croisant et al. | 180/305 |
| 3,447,619 | 6/1969 | Nodwell et al. | 180/9.46 |
| 3,543,873 | 12/1970 | Toy | 180/305 |
| 3,612,202 | 10/1971 | Moon et al. | 180/14.3 |
| 3,672,167 | 6/1972 | Griesenbrock | 180/307 |
| 3,869,013 | 3/1975 | Pagdin et al. | 180/249 |
| 3,913,697 | 10/1975 | Greene | 180/14.3 |
| 3,923,115 | 12/1975 | Helling | 180/65.2 |
| 3,994,353 | 11/1976 | Greene | 180/307 |
| 4,132,283 | 1/1979 | McCurry | 180/70.1 |
| 4,165,795 | 8/1979 | Lynch et al. | 180/65.2 |

FOREIGN PATENT DOCUMENTS

| | | | |
|---|---|---|---|
| 2133485 | 1/1973 | Fed. Rep. of Germany | |
| 2365066 | 4/1978 | France | |
| 149812 | 4/1955 | Sweden | |
| 1440484 | 6/1976 | United Kingdom | 180/65.2 |

Primary Examiner—Joseph F. Peters, Jr.
Assistant Examiner—D. Lynn Fugate
Attorney, Agent, or Firm—Guido Modiano; Albert Josif

[57] ABSTRACT

A power drive system for road vehicles comprises, in series relationship, at least a prime motor, at least a hydraulic pump driven by the prime motor and at least one hydraulic motor connected to the hydraulic pump and driving a differential gear interposed between the hydraulic motor and a respective pair of driving wheels.

4 Claims, 13 Drawing Figures

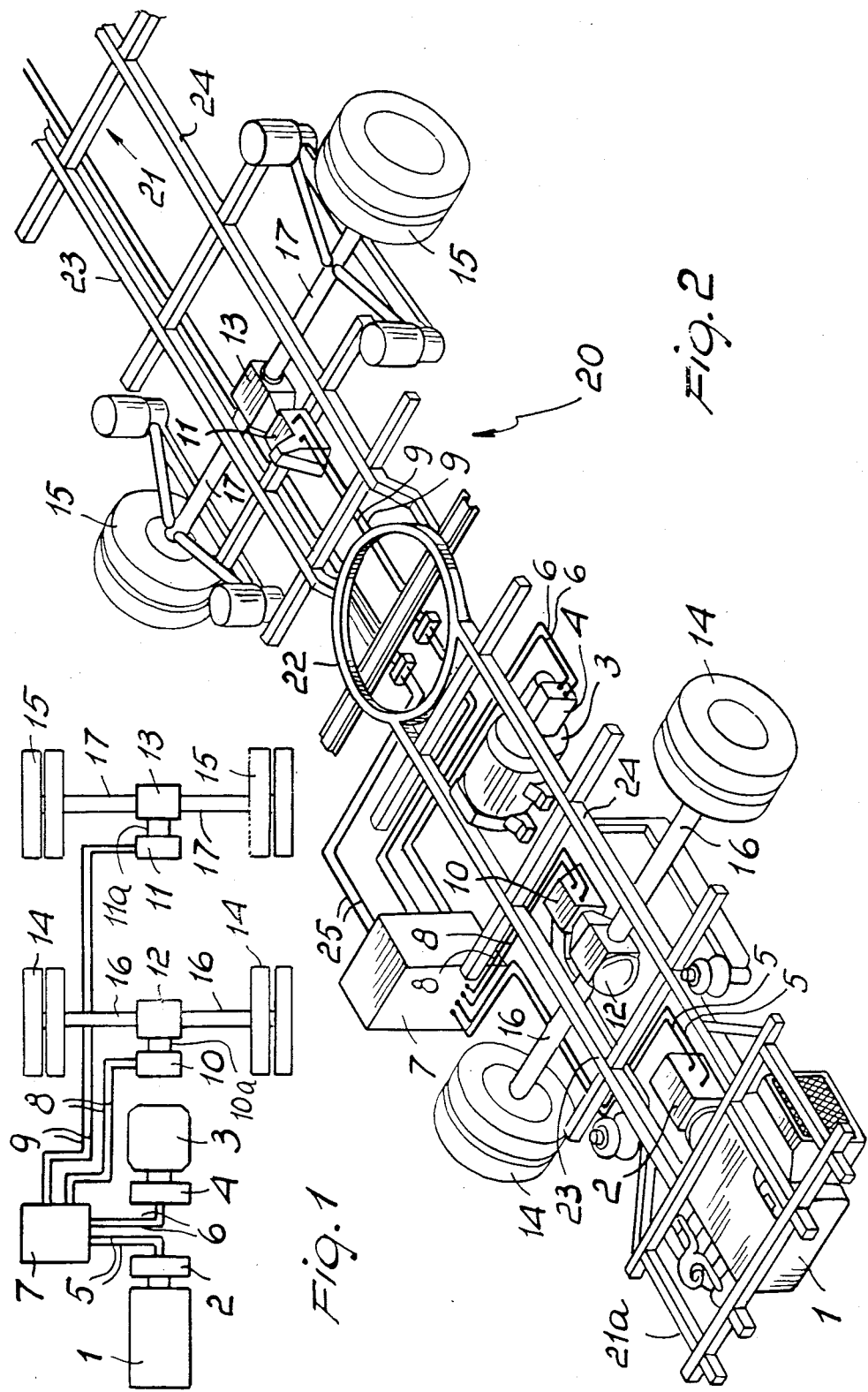

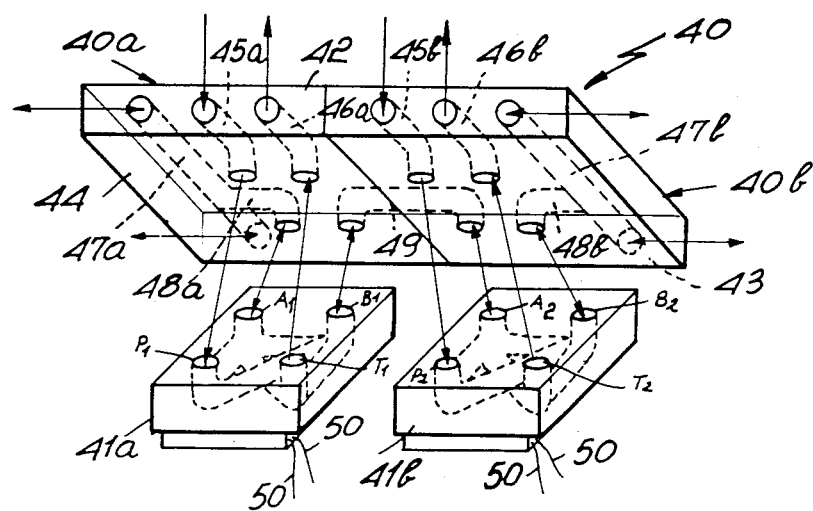
Fig. 8
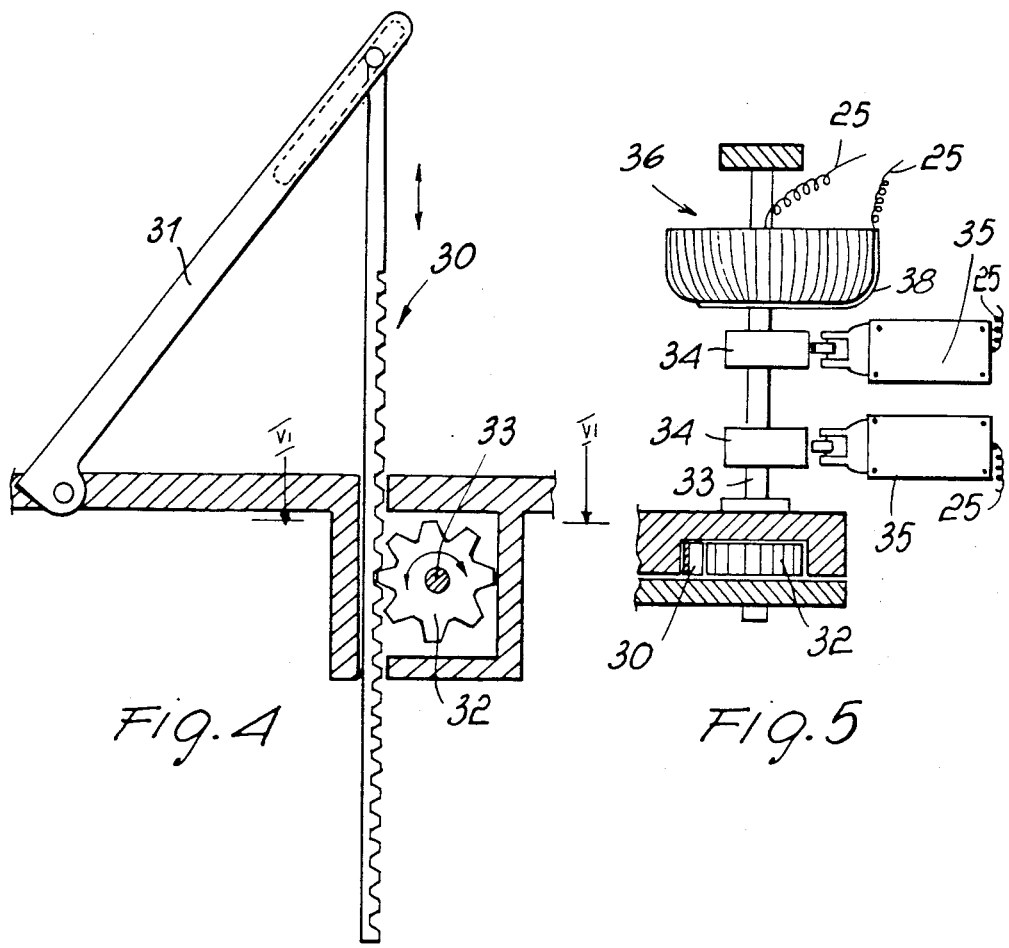
Fig. 4
Fig. 5

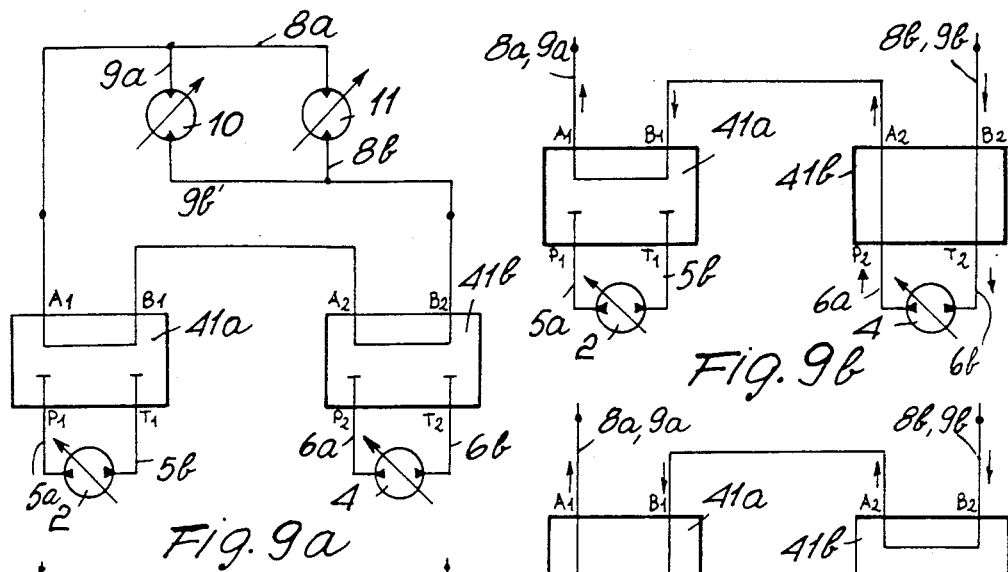
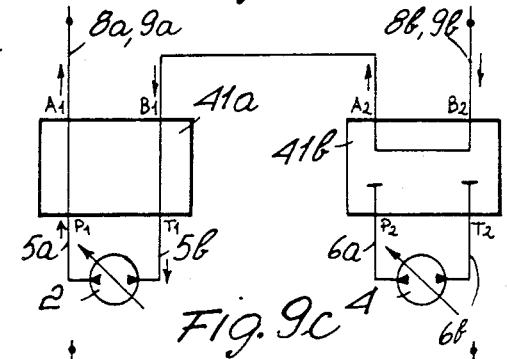
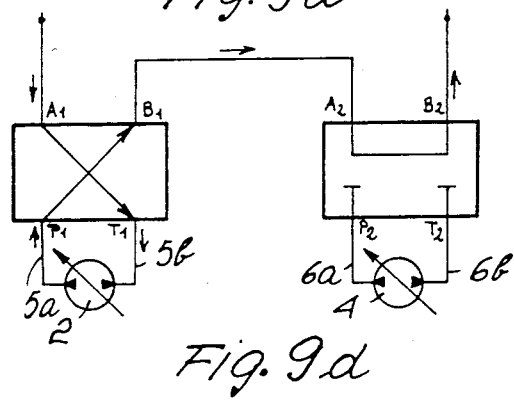
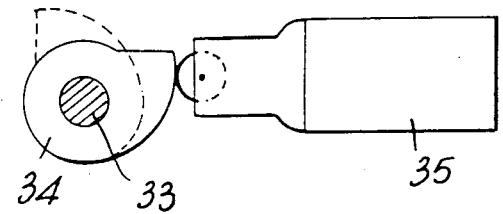
Fig. 9a
Fig. 9b
Fig. 9c
Fig. 9d
Fig. 9e
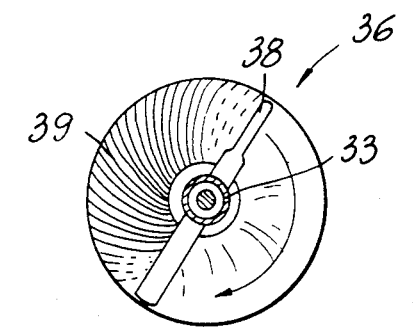
Fig. 6
Fig. 7

POWER DRIVE SYSTEM FOR ROAD VEHICLES

This is a continuation in part of patent application Ser. No. 202.908 filed on Nov. 3, 1980, now abandoned.

BACKGROUND OF THE INVENTION

This invention relates to a drive system for road vehicles, in particular public transportation and semitrailer vehicles.

Several hydrodynamic or oil-operated drive systems are currently known and marketed, all such systems being referred to hereinafter as "hydraulic drive systems", as known are advantages afforded thereby. For transmitting motive power on transportation vehicles, such hydraulic drive systems have gained acceptance mainly on account of their inherent ability to provide a continuously variable drive ratio and independent control of the speed and torque delivered to each driving wheel. To accomplish the former goal, hydraulically operated units have been developed for installation in lieu of the clutch/transmission assembly employed in traditional drives. The latter goal is instead achieved by providing a pump to feed a number of hydraulic motors, each motor being coupled to one wheel of the vehicle.

While the former systems is mainly directed to making the driving of the vehicle more convenient, as an alternative to fully automated transmissions, the latter has substantial advantages from the standpoint of engineering and economy, and is generally preferred for industrial vehicles. Moreover, the latter system affords the additional advantage of eliminating the need for differential gears and driveshafts, such that, at least in principle, it may be reduced to but one pump and two or four hydraulic motors.

However, traditional power drive systems have been definitely improved through the years, especially as relates to automatic transmissions and differential gears. Thus, the technical problem arises of investigating whether novel and particularly advantageous combinations may be found among the hydraulic drive units and mechanical drive units.

SUMMARY OF THE INVENTION

This invention sets out to solve the aforesaid technical problem by providing a novel hydraulic and mechanical drive system for road vehicles, which at least in specific conditions can be more advantageous than conventional drive systems.

More specifically, the invention is directed to providing a drive system which is particularly suitable for application to public transportation vehicles, especially vehicles of the semitrailer type.

According to one aspect of the present invention, there is provided a power drive system for road vehicles of the type having at least one differential gear for the driving wheels and which comprises serially arranged to one another, at least one prime motor, at least one hydraulic pump driven by said prime motor, and at least one hydraulic motor connected to said hydraulic pump through conduit means, and is characterized in that it comprises transmission means drivingly connecting said at least one hydraulic motor with said differential gear.

BRIEF DESCRIPTION OF THE DRAWINGS

The features and advantages of the invention will be detailed hereinafter through a description of a presently preferred embodiment thereof, with reference to the accompanying drawings, where:

FIG. 1 is a hydraulic diagram of the drive system according to the invention;

FIG. 2 shows a drive system, as illustrated diagrammatically in FIG. 1, as installed on the frame of a public transportation vehicle of the semitrailer type, of which vehicle frame only the rear portion and part of the front portion are shown;

FIG. 4 is a side view, partially in section of the brake or throttle pedal with the associated controls;

FIG. 5 is a sectional view taken along line V—V of FIG. 4 of the throttle or brake controls;

FIGS. 6 and 7 are front view of details of FIG. 5;

FIG. 8 is a perspective and exploded view of a detail of FIG. 3; and

FIG. 9a–9e are schematic diagrams of the fluid path between pumps and motors of FIG. 3 in five different running conditions of the vehicle.

DESCRIPTION OF THE PREFERRED EMBODIMENTS

Figure 3:
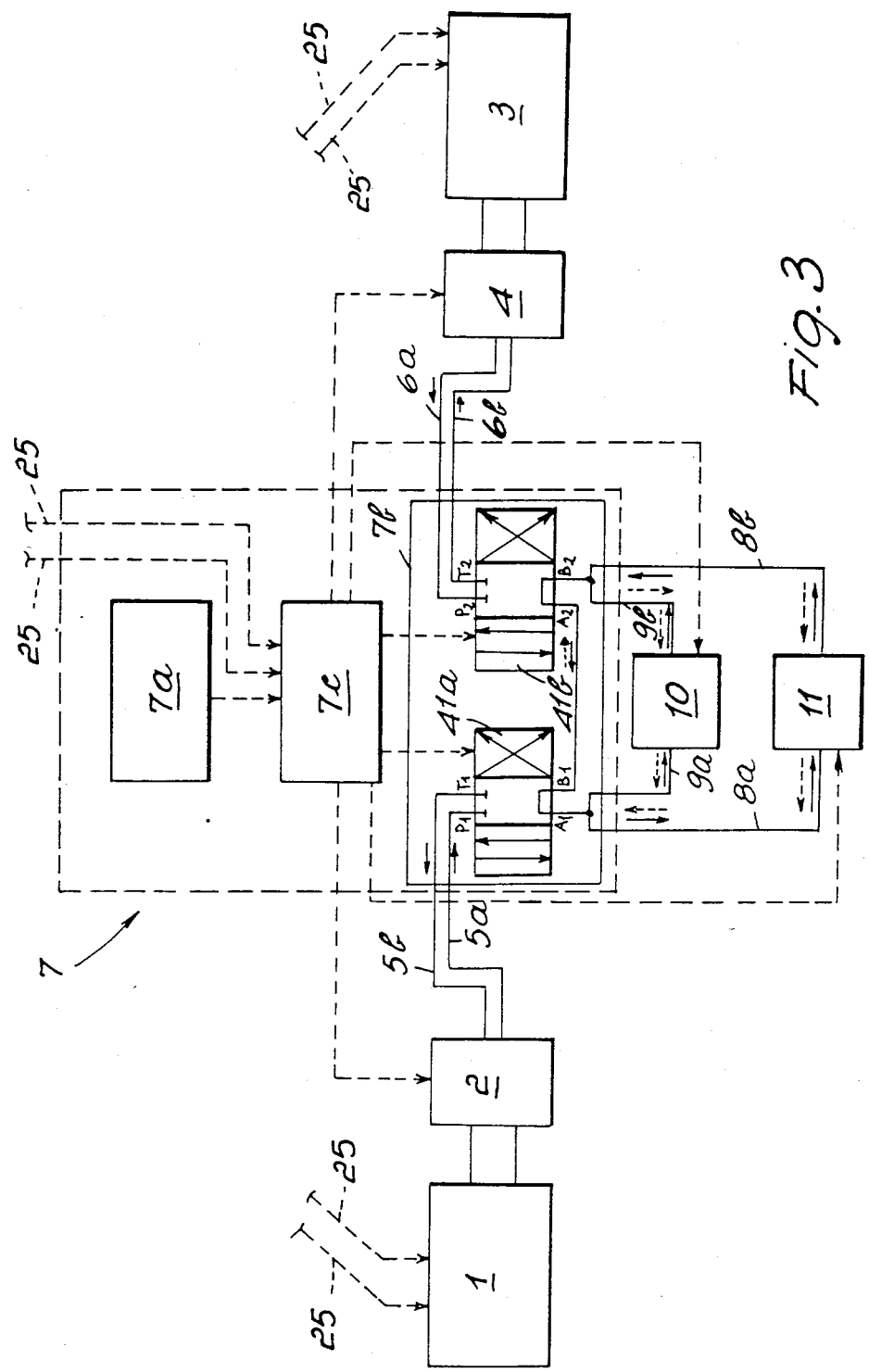
FIG. 3 is a function and hydraulic diagram of the inventive system.

With particular reference to FIG. 1, the drive system according to the invention provides in essence, and particularly for a vehicle having two drive axles, a prime motor 1, such as an internal combustion engine, driving a hydraulic pump 2 which coverts the energy generated by said engine into pressure fluid energy. In parallel therewith, there is provided an electric primary motor 3, perferably of the constant speed type, which drives, in turn, a hydraulic pump 4 of its own, identical to the pump 2 and which in turn converts the energy generated by said electrical motor into pressure fluid energy. The two pumps, 2 and 4, are respectively connected, through dual, delivery and return, first lines or ducts 5 and second lines or ducts 6, to a distributor valve unit 7 feeding in parallel, through third lines 8 and fourth lines 9, also of the dual type, respectively the two hydraulic motors 10 and 11. Such hydraulic motors are each mounted on a differential gear 12 and 13, respectively, which rotatively drive pairs of driving wheel sets, 14 and 15, through axle shafts 16 and 17.

FIG. 2 illustrates, in a topographic and schematic manner, the arrangement and location of a hydraulic system, in accordance with the layout diagram of FIG. 1, across the frame of a public transportation vehicle of the semitrailer type which has two driving axles and includes an internal combustion engine type of prime motor, e.g. a diesel engine, for self-propulsion, and a primary electric motor for operation as a trolleybus or tramcar. Corresponding parts in FIGS. 1 and 2 are designated with the same reference numerals.

The semitrailer vehicle of FIG. 2 is generally indicated at 20. Reference has been made, for illustrative purposes only, to a three-axle type of semitrailer vehicle, of which only the two rear axles are shown in the figure. There may be seen a load bearing or main frame 21 comprising two sections or body portion structures articulated to each other by a rotary ring or plate or "fifth wheel" 22, known per se, e.g. as manufactured and sold by SCHENK of Stuttgart, West Germany. The rear section or body portion mounts the prime motor 1 and primary motor 3: in particular a latticework structure 21a accommodates in internal combustion engine constituting the prime motor 1, whilst between the fifth wheel 22 and the driving wheel sets 14 there is accommodated the electric primary motor 3. The front body portion of the frame, mounting the steering wheels, is not shown in the drawing and may be set up in a manner known per se.

The motors 1 and 3, hydraulic pumps, and hydraulic motors, are all located between two parallel side spars 23 and 24, which extend from the fifth wheel 22 both towards the front section and rear semitrailer, wherefor they form the supporting framing, in a quite conventional manner. The passenger-carrying coach is positioned on both frame sections or portions.

The hydraulic motors 10 and 11 are mounted directly over the differential gears 12 and 13, and are swingable therewith. Alternatively a cardan shaft connection (not shown) may be provided between the hydraulic motors 10,11 and the differential gears 12,13 respectively.

As shown in FIG. 2, connections 25 are led to the valve unit 7, as well as the prime motor 1 and primary motor 3, which interconnect these elements with the throttle and brake controls at the driver's station shown in FIGS. 4–7. In such figures only the throttle controls are shown, the brake controls being the same. As it may be seen from these figures, the throttle controls consist essentially of a rack 30 connected with an end thereof to the throttle pedal 31, a gear 32 meshing with the rack 30, a driving shaft 33 fixed to the gear 32 and rotatable therewith, cams 34 fixed to the driving shaft and acting on microswitches 35, and a rheostat 36. The connection between the throttle pedal 31 and the rack 30 shown in the form of a slotted lever hinge connection may be of any type, provided that, when the pedal 31 is pressed by the utilizer's foot, the rack moves downwardly, whereas when the driver releases the action on the pedal, the rack is moved upwardly by the action e.g. of a spring (not shown). The longitudinal movement of the rack causes a rotation of the gear 32 and of the herewith connected driving shaft 33 in counterclockwise or clockwise, according to whether the pedal has been pressed or released, respectively. Consequently also the cams 34 are rotated and brought out of or in engagement with the microswitches 35, as it may be seen from FIG. 6. The microswitches 35 are connected by means of leads 25 to the valve unit 7 and are intended the first one to allow the electronic circuits of the valve unit 7 to begin the swept volume control, and the second one is for security functions: in fact the valve unit always controls that, when the brake pedal is actuated, the throttle controls have been returned to their rest position. Furthermore the vehicle is permitted to start only if the electronic circuits of the valve unit 7 have received all the signals stating that the vehicle doors have been closed, the air pressure is at the desired value, the engine bonnet is closed, and so on.

The rheostat shown in the drawings is of the type with a contact 38 fixed to the driving shaft 33 and sliding on the coils 39 of the rheostat, so that the electric path of the current between the input and the output leads 25 and consequently the intensity of the signal fed to the valve unit 7 and motors 1,3 can be varied according to the position of the pedal 31. By means of the rheostat 36 it is possible to vary the cylinder capacity of the pumps and of the motors in order to increase or decrease the speed of the vehicle. When the pedal 31 is released, a spring not shown causes the return of the pedal 31, the rack 30 is moved upwardly and the cams 34 are brought in engagement with the microswitches 35.

For the brake controls the operation is the same, whereas, when the vehicle operates as trolleybus or tramcar, and the brake pedal has been pressed, the first microswitch sends an electrical signal which causes the electric braking to start. On the contrary, the second microswitch has the function of preventing the simultaneous actuation of the brake and of the throttle controls and sends an electric signal to valve unit 7 for this purpose.

The unit 7 controls the liquid flow being circulated, both for starting and braking purposes, by acting on the hydraulic pumps 2,4, and on the hydraulic motors 10,11. Moreover, the unit 7 includes a change-over device, which is operative to prevent the simultaneous actuation of the motors 1 and 3. More specifically, the unit 7 is only ideally, for convenience of illustration, shown as a unitary construction. In actual practice, the various elements which concur to the functions of the unit 7 may be scattered throughout the vehicle structure, while remaining operatively interconnected. In essence, besides the cited change-over device, such elements may be divided into: electric control devices 7a, solenoid valve devices 7b, and electric control devices 7c.

The electric control devices 7a are sensors adapted for detecting the vehicle travel condition parameters (e.g. the wheel rpm's, the rpm's of the prime motor when in operation, the road gradient, the oil pressure and temperature, etc., in the various circuits) and feeding respective electric signals to the electric control devices 7c.

The solenoid valve device 7b consists of a perforated plate 40 (illustrated in detail in the exploded view of FIG. 8) and two equal solenoid valves 41 represented only schematically in FIG. 3 (according to the symbols used in "Glossary of fluid power terminology" Fluid Power Society, 1969, pg. 219) and which working positions are illustrated in FIG. 9a–9e for different running conditions of the vehicle.

With reference to FIG. 8, the perforated plate 40 is devided into two parts: a first part 40a (on the left in the drawing) connected to the pump 2 of the internal combustion engine 1, and a second part 40b (on the right) connected to the pump 4 of the electric motor 3. The two parts are symmetric and present a plurality of internal channels opening on the lateral and lower surfaces of the plate. In detail the left-hand part 40a presents a first elbow channel 45a opening with an end thereof on the front surface 42, where it is jointed to the delivery line 5a (FIG. 3), and with the other end thereof on the lower surface 44 at the opening $P_1$ of the valve 41a; and a second elbow channel 46a opening with an end thereof on the front surface 42, where it is jointed to the return line 5b (FIG. 3), and with the other end thereof on the lower surface 44 at the opening $T_1$ of the valve 41a. In the left-hand part 40a there is also provided a linear channel 47a, opening with an end thereof on the front surface 42 and here connected to the line 8a (FIG. 3) and with the other end thereof on the rear surface 43 and here connected to line 9a, furthermore the channel 47a presents a channel branch 48a opening on the lower surface 44 at the opening $A_1$ of valve 41a. The right-hand part 40b is provided with channels 45b; 46b, 47b and 48b analogous to those of the left-hand part, whereas channel 45b is jointed to delivery line 6a and opens at $P_2$, channel 46b is jointed to return line 6b and opens at $T_2$, channel 47b is connected to lines 8b and and 9b, channel 48 opens at $B_2$.

The plate 40 is also provided with a two-elbow channel 49, extending between the left-hand and right-hand parts 40a and 40b and opening on the lower surface 44 and $B_1$ with an end thereof and at $A_2$ with the other end thereof. In FIG. 8 arrows illustrate the flowing direction of the fluid, whereas double arrows indicate that the fluid can flow in either directions for direct and reverse motion respectively, as it will be explained more fully hereinafter with reference to FIG. 9a-9e.

The solenoid valves 41a, 41b, which when the valve device 7b is assembled, are fixed to perforated plate 40 such that their openings A,B,P,T are jointed to the channels of plate 40 in the manner above described, are of the type in which an internal cursor or slide (not shown), operated by magnets, cuts off or permits communication between the openings on the base of the signals received on the leads 50 from the electric control devices 7c. Such solenoid valves for example those manufactured by KRACHT and on the market under the name WL 4.20, are well known in the art, so that they will not be described in detail.

The electric control devices 7c receive signals from both said electric control devices 7a, and the controls located at the driver's station as explained with reference to FIGS. 4–7. The signals are processed, and so converted as to control both the position of the solenoid valves 7b and the flow rates of the hydraulic pumps 2 or 4 and hydraulic motors 10 and 11. In fact, the system according to this invention may include advantageously hydraulic motors 10 and 11 and hydraulic pumps 2 or 4 of the variable swept volume type or variable flow rate type, that is wherein the rpm's and flow rate (at constant rpm's) can be changed independently.

The electric control devices 7c consist of a plurality of electronic circuits mounted on cards and comprising integrated elements (static logic) but should also comprise a computer or microprocessor which, on the basis of a program, controls the state of different inputs and sends control signals to the pumps 2 and 4 in order to vary the oil quantity delivered therefrom and to the solenoid valve devices 7b in order to change over the different functioning mode thereof.

The net result is that, whereas the rpm's of the pumps 2 or 4 and motors 10 and 11 are respectively dictated by the rpm's of the prime motor 1 and primary motor 3, which are directly controlled by the driver, and the amount of oil being circulated through the lines 8 and 9, the flow rate or swept volume of said pumps and motors is controlled by the electric control devices, both in accordance with the driver's own decisions and of the running conditions detected by the electric devices 7a.

FIG. 3 illustrates the operation of the drive system as described hereinabove, the unit 7 being subdivided into said portions 7a, 7b, 7c, there being shown in addition to the hydraulic diagram already shown in FIG. 1, also mutual interactions, as indicated in dotted lines, between the various members.

FIG. 3 indicates also the flowing path of the fluid between pumps 2,4 and motors 10,11, whereas continuous arrows illustrate the flow direction in case of direct motion of the vehicle (where only one motor, either internal combustion engine 1 or electrical engine 3 is active) and dotted arrows illustrate the flow direction in case of reverse motion (the flow between pumps 2 or 4 and valve 7b occurring only in one and the same direction, the dotted arrows have not been illustrated). More details about the flowing path can be got from FIG. 9a-9e, with schematically show the positions of valves 40 when the motors 10,11 are short-circuited, in case of direct motion driven by the electric engine 3, in case of direct motion driven by the internal combustion engine 1, in case of reverse motion driven by the internal combustion engine 1 and in case of reverse motion driven by the electric engine 3, respectively. Referring now to FIG. 9a, the inoperative pumps 2, 4 are shut off, whereas the hydraulic motors 10,11 are short-circuited. In this case the opening $A_1$ is connected to the opening $B_1$ and the opening $A_2$ is connected to the opening $B_2$. This position of valves 41 is selected in case of failure, when the vehicle must be towed and, in order to allow the movement of the wheels of the same, the fluid must circulate in the motors 10,11.

FIG. 9b refers to the direct motion driven by the electric engine 3: in this case the opening $P_2$ is connected to opening $A_2$ and opening $B_2$ is connected to $T_2$, whereas the pump 2 is shut off and opening $A_1$ and $B_1$ are directly connected. Whereas the flow direction is indicated by arrows, the hydraulic motors 10,11 have only been illustrated in FIG. 9a and has not been indicated in FIGS. 9b, 9c, 9d, 9e for easiness. FIG. 9c corresponds to the case of direct motion driven by the internal combustion engine 1: the pump 4 is now shut off, opening $P_1$ is connected to $A_1$ and opening $B_1$ is connected to $T_1$, whereas opening $A_2$ and $B_2$ are directly connected. In FIG. 9d the flowing path of the fluid is illustrated in case of reverse motion driven by the internal combustion engine 1. As it may be seen, in this case the flow direction between hydraulic motors 10,11 and valves 41 is reversed, opening $P_1$ is connected to $B_1$, opening $A_1$ is connected to $T_1$, openings $A_2$ and $B_2$ are directly connected and the electric engine pump 4 is shut off. On the contrary in FIG. 9e (representing the case of reverse motion driven by the electric motor 3), opening $P_2$ is connected to $B_2$, $A_2$ is connected to $T_2$ and $A_1$, $B_1$ are directly connected between themselves. The pump 2 is here shut off.

In practice, the road vehicle is jointly placed under control by the driver, who will control the prime motor 1 and primary motor 3 directly, and by the unit 7 which will control the power delivered to the differentials 12 and 13 in accordance with the running conditions of the vehicle and the driver's decisions.

By way of example, and in order to show how the invention can be implemented by utilizing readily available means, the internal combustion engine prime motor 1 may be a Magirus-Deutz V-8 diesel engine of 256 HP, while the primary electric motor 3 may be a Marelli motor developing 190 KW at 2600 rpm's and the hydraulic pumps 2 and 4 may be of the Linde BPV 100 model type, while the hydraulic motors 10 or 11 may be of the Linde BMV 105 model type, the vehicle frame may be a Fiat 470 main frame, and the differentials 12 or 13 may be a Fiat differential gear with a 1:12 gear ratio.

The advantages afforded by this drive system may be summarized as follows.

The fact should be considered first that the problems inherent to the drive train ending with the drive axles are effectively solved without involving any alteration of readily available and proven assemblies. This is particularly important for semitrailer vehicles, where the driveshafts pose serious installation and operation problems, owing to the long distances, sharp bends, and likelihood vibration involved.

Another advantage is that in the drive system of this invention, it is easy to optimize the distribution of the torque to the axles, the differences among such torques being relatively small. The torque distribution between the inside and outside wheels in a bend is instead practically accomplished through the differential gear, where the rpm's are dictated by the steering radium rather than by the torque, which instead adjusts itself to the demand.

Therefore, the invention achieves a maximum in economy optimization, while leaving unaffected the behavior of the vehicle in a bend. Finally, with the electric motor operating at a constant speed, no pick up power need be applied at each start in the case of the trolleybus application. Accordingly, the power requirements on the mains can be reduced drastically.

By way of example, a single embodiment has been described, but the invention is not limited thereto, neither as relates to the type of vehicle, nor to the number of the axles involved or provided. For instance, a two-axle vehicle may be contemplated, wherein a single, either Diesel or electric, prime motor is preferable, each hydraulic motor being then connected to its related differential gear through a conventional driveshaft set up in a similar manner to conventional road vehicle shafts.

I claim:

1. A power driven system for road vehicles, in particular public transportation and semitrailer vehicles in combination with the body and suspension structure of the vehicle, comprising at least one prime motor supported on the body structure of the vehicle and utilising a first type of energy source, at least one hydraulic pump on said body structure and driven by said prime motor thereby to convert the energy of said motor into first pressure fluid energy, at least one primary motor supported on said body structure at a distance from said prime motor and utilising a second type of energy source different from said first one, at least one second hydraulic pump on said body structure and driven by said primary motor thereby to convert the energy of said primary motor into second pressure fluid energy, at least one differential gear on at least one axle of said vehicle and at least one hydraulic motor transmissively connected with said differential gear, controllable means being provided connecting said first and second hydraulic pumps with said at least one hydraulic motor thereby to convey selectively said first and said second pressure fluid energy from said hydraulic pumps to said at least one hydraulic motor, said hydraulic motor driving said differential gear and the axle and the wheels mechanically connected therewith.

2. A system according to claim 1, wherein said prime motor is an internal combustion engine and said primary motor is an electric engine.

3. A system according to claim 1, wherein said means comprise a controllable distributor valve on said body structure, first circuit means hydraulically connecting said one hydraulic pump with said valve thereby to convey said first pressure fluid energy to said valve, second circuit means hydraulically connecting said second hydraulic pump with said valve thereby to convey said second pressure fluid energy to said valve, and at least third circuit means hydraulically connecting said valve with said hydraulic motor thereby to convey selectively said first and said second pressure fluid energy from said valve to said at least one hydraulic motor, said hydraulic motor driving said differential gear and the axle and wheels mechanically connected therewith.

4. A system according to claim 1, wherein said vehicle is a semitrailer vehicle having a rear body portion structure with at least one driving wheel axle shaft assembly and at least one front body portion structure articulated to said rear body portion structure and having at least a second driving wheel axle shaft assembly and including a fifth wheel mechanism providing articulation between said rear body portion structure and said front body portion structure, and wherein said prime motor and said primary motor are mounted at a distance from one another on said rear body portion structure and wherein said first and second driving wheel axle shaft assemblies each include one said hydraulic motor and one said differential gear transmissively connected therewith.

* * * * *